United States Patent
Niemi

(10) Patent No.: US 10,727,691 B2
(45) Date of Patent: Jul. 28, 2020

(54) METHODS AND SYSTEMS FOR ADAPTIVE LOAD CONTROL

(71) Applicant: Landis+Gyr Innovations, Inc., Alpharetta, GA (US)

(72) Inventor: Mikko Niemi, Austin, TX (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 33 days.

(21) Appl. No.: 16/034,556

(22) Filed: Jul. 13, 2018

(65) Prior Publication Data

US 2019/0020219 A1 Jan. 17, 2019

Related U.S. Application Data

(60) Provisional application No. 62/532,663, filed on Jul. 14, 2017.

(51) Int. Cl.
| | |
|---|---|
| H02J 13/00 | (2006.01) |
| F24F 11/88 | (2018.01) |
| G05B 13/02 | (2006.01) |
| H02J 3/14 | (2006.01) |
| H02J 3/36 | (2006.01) |

(52) U.S. Cl.
CPC .......... *H02J 13/0006* (2013.01); *F24F 11/88* (2018.01); *G05B 13/021* (2013.01); *H02J 3/14* (2013.01); *H02J 3/36* (2013.01)

(58) Field of Classification Search
CPC . H02J 13/0006; H02J 3/14; H02J 3/36; G05B 13/021; F24F 11/88
See application file for complete search history.

(56) References Cited

U.S. PATENT DOCUMENTS

| | | | | |
|---|---|---|---|---|
| 5,675,503 | A * | 10/1997 | Moe | H02J 3/14 307/32 |
| 7,908,117 | B2 * | 3/2011 | Steinberg | G05B 13/048 702/182 |
| 9,691,111 | B2 * | 6/2017 | Ree | G06Q 50/06 |
| 2004/0117330 | A1 * | 6/2004 | Ehlers | H04L 67/12 705/412 |
| 2005/0143865 | A1 * | 6/2005 | Gardner | H02J 3/14 700/291 |
| 2007/0021874 | A1 * | 1/2007 | Rognli | G06Q 30/0207 700/295 |

(Continued)

*Primary Examiner* — Jason Lin
(74) *Attorney, Agent, or Firm* — Kilpatrick Townsend & Stockton LLP

(57) ABSTRACT

An adaptive load control system includes: a load monitoring and control device configured to monitor operating conditions of a load connected to an electrical power grid, and transmit load operating condition data; and a head-end load controller configured to: receive the load operating condition data; obtain data from externals sources about external factors that influence the load operating conditions; and generate load control profiles based on the data from external sources that control a duty cycle for the load during a scheduled load control event. The load control profiles include instructions to increase the off time of the duty cycle for the load when the scheduled load control event overlaps a normal off time of the load, and one of the load control profiles is selected based on a comparison of the data from external sources and a forecast of external conditions during the scheduled load control event.

16 Claims, 4 Drawing Sheets

(56) References Cited

U.S. PATENT DOCUMENTS

| | | | |
|---|---|---|---|
| 2008/0172312 A1* | 7/2008 | Synesiou | G06Q 10/00 705/34 |
| 2010/0222935 A1* | 9/2010 | Forbes, Jr. | G06Q 10/00 700/291 |
| 2011/0208368 A1* | 8/2011 | Milazzo | G06Q 50/06 700/295 |
| 2013/0178995 A1* | 7/2013 | Ree | G06Q 50/06 700/295 |
| 2013/0282181 A1* | 10/2013 | Lu | H02J 3/14 700/275 |
| 2015/0324696 A1* | 11/2015 | Hirschbold | G06N 20/00 706/46 |

* cited by examiner

METHODS AND SYSTEMS FOR ADAPTIVE LOAD CONTROL

CROSS-REFERENCES TO RELATED APPLICATIONS

This application claims priority to U.S. Provisional Patent Application No. 62/532,663, filed on Jul. 14, 2017, entitled "Adaptive Load Control," the disclosure of which is hereby incorporated by reference in its entirety for all purposes.

BACKGROUND

Utility companies, for example power companies, may institute load management programs to reduce peak loads on their power grids. Traditional load control is based on cycling loads such as air conditioners on and off. Typically, the cycling of these loads uses the same duty cycle setting for all loads regardless of the actual run-time of the load. For example, a heating, ventilating, and air conditioning (HVAC) unit for one residence may run 75% of the time, whereas an HVAC unit for a neighboring residence may run 50% of the time. The difference may be due to a difference in insulation or other differences between the units or the residences. If a utility initiates a load control event and specifies a 40% duty cycle for both residences (i.e., control the loads so they are off 40% of the time), it is possible that the residence with an HVAC unit running 50% of the time (and off 50% of the time) may not contribute to the load reduction since the 40% off cycle of the load control event may occur during the natural 50% off cycle of the HVAC unit. This may result in "free-riding" if the residence is not contributing to the utility peak load reduction, but still receives incentives from the utility for participating in the load management program.

SUMMARY

Embodiments of the present invention relate to electrical utility systems. More particularly, embodiments relate to methods and systems for adaptively controlling peak loads on an electrical power grid.

Numerous benefits are achieved by way of the present invention over conventional techniques. For example, embodiments of the present invention provide a method of reducing the load on a power grid by adaptively controlling duty cycles of loads connected to the power grid. By utilizing embodiments of the present invention, methods and systems are provided that enable a power utility to control individual operational times of loads to ensure each controlled load contributes to load reduction during a load control event. For example, when a utility commands a 50% load reduction during a load control event, the duty cycle of a load that would normally be off during the load control event may be increased (e.g., to 60% or another percentage) to provide more accurate load control. Additionally, "free-riding," i.e., receiving incentives for a load not contributing to peak load reduction because its natural off cycle coincides with the load control event, is eliminated.

Another benefit achieved by way of the present invention over conventional techniques involves consideration of external factors, e.g., weather, environmental conditions, etc., in the determination of the duty cycle of a load during a load control event. These and other advantages and features provided by various embodiments are described in more detail in conjunction with the text below and attached figures.

According to an aspect of the present disclosure there is provided an adaptive load control system. In some aspects, the system may include: a load monitoring and control device configured to monitor operating conditions of a load connected to an electrical power grid, and transmit load operating condition data; and a head-end load controller.

The head-end load controller may be configured to: receive the load operating condition data; obtain data from externals sources about external factors that influence the load operating conditions; and generate one or more load control profiles based at least in part on the data from external sources that control a duty cycle for the load during a scheduled load control event. The one or more load control profiles may include instructions to increase the off time of the duty cycle for the load when the scheduled load control event overlaps a normal off time of the load. One of the one or more load control profiles may be selected based at least in part on a comparison of the data from external sources used to create the selected load control profile and a forecast of external conditions during the scheduled load control event.

The head-end load controller may be configured to increase the off time of the duty cycle based on the normal off time of the load and a specified cycle value. The cycle value may be a specified value by which the normal off time is increased.

The head-end load controller may be configured to generate an individual run time profile for each specified load, and generate the load control profile for the load based at least in part on the run time profile.

The head-end load controller may be configured to generate the load control profile based at least in part based on the run time profile, the data about external factors, and the anticipated loading on the electrical power grid. The load monitoring and control device may monitor operating conditions of the load for a specified period of time during normal operation of the load. The specified period of time for monitoring the load may be shorter than the duration of a load control event.

According to an aspect of the present disclosure there is provided method for adaptively controlling a load. In some aspects, the method may include: monitoring operating conditions of a load connected to an electrical power grid; obtaining data from externals sources about external factors that influence the load operating conditions; and generating one or more load control profiles based at least in part on the data from external sources that control a duty cycle for the load during a scheduled load control event. The one or more load control profiles may include instructions to increase the off time of the duty cycle for the load when the scheduled load control event overlaps a normal off time of the load, and one of the one or more load control profiles may be selected based at least in part on a comparison of the data from external sources used to create the selected load control profile and a forecast of external conditions during the scheduled load control event.

The method may include increasing the off time of the duty cycle based on the normal off time of the load and a specified cycle value. The cycle value may be a specified value by which the normal off time is increased. The method may include generating an individual run time profile for each specified load.

The method may include generating the load control profile for the load based at least in part on the run time profile, and generating the load control profile based at least in part based on the run time profile, the data about external factors, and the anticipated loading on the electrical power grid.

The method may include monitoring the operating conditions of the load for a specified period of time during normal operation of the load. The specified period of time for monitoring the load may be shorter than the duration of a load control event.

These and other embodiments of the invention along with many of its advantages and features are described in more detail in conjunction with the text below and attached figures.

BRIEF DESCRIPTION OF THE DRAWINGS

FIG. 2 is a block diagram illustrating a head-end load controller according to various aspects of the present disclosure;

FIG. 3 is a block diagram 300 illustrating a load monitoring and control device 130 according to various aspects of the present disclosure;

DETAILED DESCRIPTION

While certain embodiments are described, these embodiments are presented by way of example only, and are not intended to limit the scope of protection. The methods and systems described herein may be embodied in a variety of other forms. Furthermore, various omissions, substitutions, and changes in the form of the example methods and systems described herein may be made without departing from the scope of protection.

Aspects of the present disclosure provide a load control system that uses a customized duty cycle based on the actual run time of each electrical load so that the loads contribute more equally to the load reduction. The load control system may be implemented by a power utility company and may monitor the actual run time of each electrical load and create a run time profile for each electrical load. The run time profile may be associated with factors or events that impact the run time (i.e., operational time) of the electrical load. For example, if the load is an HVAC system, then the run time profile may be associated with weather conditions, a time of day, a day of the week, or a calendar day. The system may use the run time profile, as well as anticipated factors or events, to generate a duty cycle for each load to be implemented during load control event.

Figure 1:
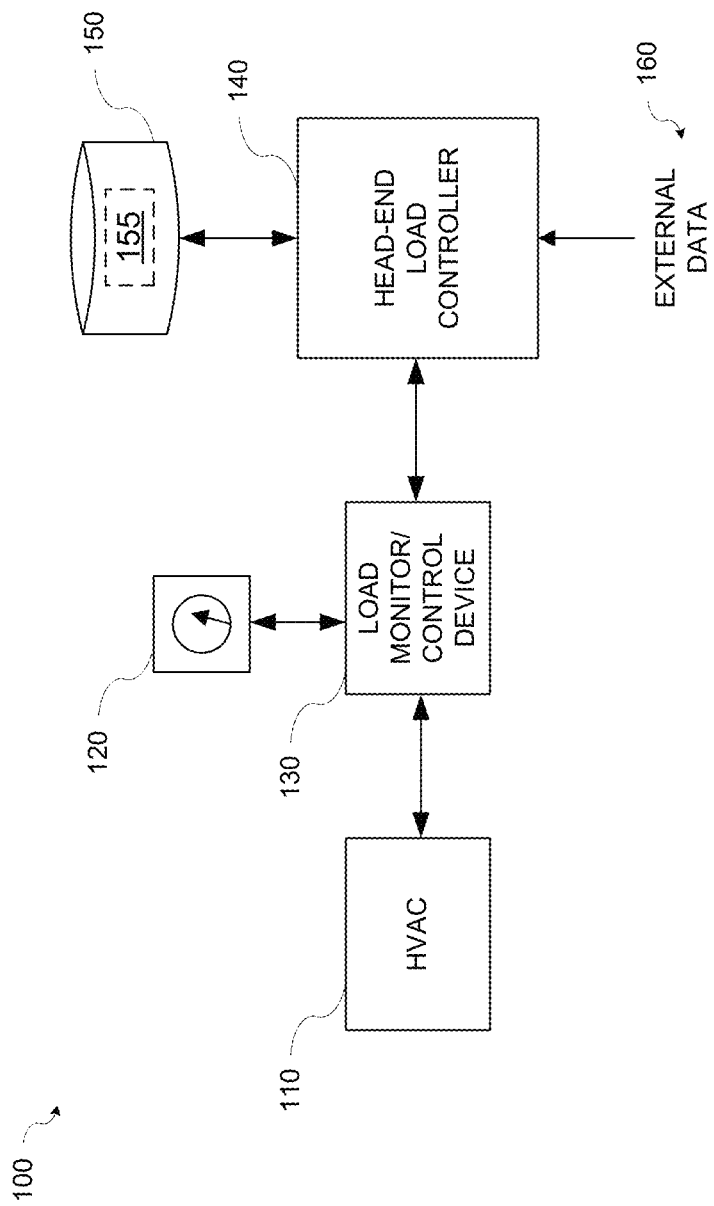
FIG. 1 is is a diagram illustrating an adaptive load control system according to various aspects of the present disclosure.

FIG. 1 is a diagram illustrating a load control system 100 according to various aspects of the present disclosure. Referring to FIG. 1, the load control system 100 may include a load 110, a load regulating device 120, a load monitoring and control device 130, a head-end load controller 140, and a storage device 150. The load 110 may be an HVAC system. While FIG. 1 illustrates an HVAC system load, embodiments in accordance with the present disclosure are not limited to this implementation. For example, other types of loads may also be controlled, including, but not limited to, water heaters, pool pumps, electric vehicle charging stations, etc., without departing from the scope of the present disclosure. One of ordinary skill in the art will appreciate that this is not an exhaustive list of loads that may be controlled by the disclosed load control system. The HVAC system will be used throughout the description as an exemplary load for ease of explanation.

The load regulating device 120 may be a device local to the load and may regulate and/or provide local control during normal operation of the load 110. The load regulating device 120 may be, for example, but not limited to, a thermostat. One of ordinary skill in the art will appreciate that other load regulating devices may be used without departing from the scope of the present disclosure.

The load monitoring and control device 130 may be supplied by the power utility company and may be connected between the load 110 and the load regulating device 120. The load regulating device 120 may monitor the run time of the HVAC system and communicate the run time information about the load 110 to the head-end load controller 140. For example, the load regulating device 120 may monitor days of the week and times of the day when the load 110 is operating and communicate the information to the the head-end load controller 140. One of ordinary skill in the art will appreciate that other information, for example, but not limited to, average power consumed, peak power, etc., may be monitored and communicated by the load monitoring and control device 130.

In addition, the load monitoring and control device 130 may receive load control instructions from the head-end load controller 140. The head-end load controller 140 may control multiple load monitoring and control devices 130. Normal operating commands to the load 110 generated by the load regulating device 120 may be transmitted to the load 110 through the load monitoring and control device 130. The load monitoring device and control 130 may override any normal operating commands from the load regulating device 120 and cause the load 110 to operate in accordance with the instructions received from the head-end load controller 140. For example, the load monitoring and control device 130 may receive instructions from the head-end load controller 140 to deactivate the load 110 (e.g., the HVAC system) during a period of time when the load regulating device 120 (i.e., the thermostat) commands the HVAC system to operate. The load monitoring and control device 130 may override the commands from the thermostat and cause the HVAC to shut off in accordance with the instructions from the head-end load controller 140.

The load monitoring and control device 130 may communicate with the load 110, the load regulating device 120, and the head-end load controller 140 via wired or wireless communication interfaces known to those of skill in the art using communication protocols appropriate to the specific communication interface. Different wired or wireless communication interfaces and associated communication protocols may be implemented on the load monitoring and control device 130 for communication with different devices. For example, a wired communication interface may be implemented between the load monitoring and control device 130 and the load 110 and/or the load regulating device 120, while a wireless communication interface may be implemented for communication between the load monitoring and control device 130 and the head-end load controller 140.

In some embodiments, the head-end load controller may integrate with an energy management system to directly control a load, for example, in large factories, shopping malls, office buildings, etc., that have such systems in place. In cases where the head-end load controller is integrated with the energy management system the energy management system may be responsible for executing the control strategy.

Figures 2, 3:
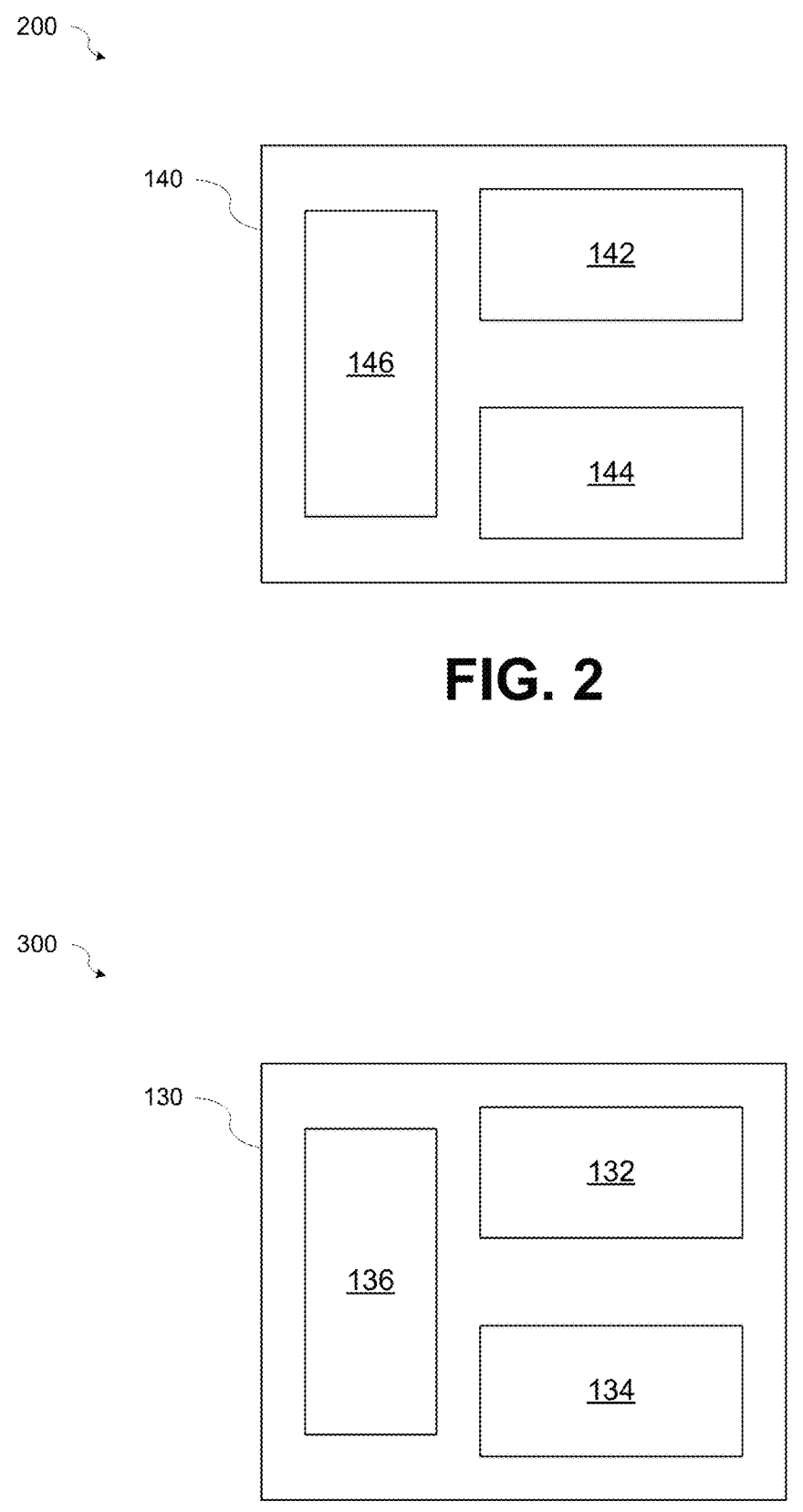

FIG. 2 is a block diagram 200 illustrating a head-end load controller 140 according to various aspects of the present disclosure. Referring to FIG. 2, the head-end load controller 140 may control overall operation of the load control system 100. The head-end load controller 140 may include a first processor 142, a first memory 144, and a first communications interface 146.

The first processor 142 may be a microprocessor; however, embodiments in accordance with the present disclosure are not limited to this implementation. For example, the first processor 142 may be a microprocessor, microcomputer, computer, microcontroller, programmable controller, or other programmable device. One of ordinary skill in the art will appreciate that other variations may be implemented without departing from the scope of the present disclosure. The first memory 144 may be, for example, but not limited to, one or more solid state memory devices or other memory devices. The first memory 144 may store data and instructions for operation and control of the load control system 100.

The head-end load controller 140 may communicate with the load monitoring and control device 130 and the storage device 150 via the first communications interface 146. Further, the head-end load controller 140 may communicate with sources of external data, for example, but not limited to, weather data or other data, proximity data, geolocation data, etc. For example, if a house is unoccupied, more aspects of the house may be controlled. Further, data defining the electrical connectivity, for example, the control devices attached to homes that are connected to a certain distribution transformer, substation, phases, etc., may be used to provide additional control of electrical loads related to the house.

Different wired or wireless communication interfaces and associated communication protocols may be implemented by the first communication interface 146 on the head-end load controller 140 for communication with different devices. For example, a wired communication interface may be implemented between the head-end load controller 140 and the storage device 150, while a wireless communication interface may be implemented for communication between the head-end load controller 140 and the load monitoring and control device 130 as well as between the head-end load controller 140 the sources of external data, for example, but not limited to, the internet. One of ordinary skill in the art will appreciate that other communications configurations may be used without departing from the scope of the present disclosure.

The storage device 150 may be, for example, but not limited to, one or more hard-disk drives, solid-state memory devices, or other computer-readable storage media. One of ordinary skill in the art will appreciate that other storage configurations may be used without departing from the scope of the present disclosure. A database 155 may be stored on the storage device 150.

The database 155 may include run time data for a plurality of loads to be controlled by the load control system 100. For example, the database 155 may include days of the week and times of the day when a load is operating, average power consumed by the load, peak power consumed by the load, etc. One of ordinary skill in the art will appreciate that this information is exemplary and that other information may be included in the database 155 without departing from the scope of the present disclosure.

FIG. 3 is a block diagram 300 illustrating a load monitoring and control device 130 according to various aspects of the present disclosure. Referring to FIG. 3, the load monitoring and control device 130 may include a second processor 132, a second memory 134, and a second communications interface 136. The load monitoring and control device 130 may monitor the load 110 and transmit run time data of the load to the head-end load controller 140. For example, the load monitoring and control device 130 monitor the load during normal operation of the load and transmit via the second communications interface 136 the run time data of the load to the head-end load controller 140.

The second processor 132 may be a microprocessor; however, embodiments in accordance with the present disclosure are not limited to this implementation. For example, the second processor 132 may be a microprocessor, microcomputer, computer, microcontroller, programmable controller, or other programmable device. One of ordinary skill in the art will appreciate that other variations may be implemented without departing from the scope of the present disclosure. The second memory 134 may be, for example, but not limited to, one or more solid state memory devices or other memory devices. The second memory 134 may store data and instructions for operation and control of the load monitoring and control device 130 as well as instructions received from the head-end load controller 140 for controlling the load 110.

The load monitoring and control device 130 may communicate with the head-end load controller 140, the load 110, and the load regulation device 120 via the second communications interface 136. Different wired or wireless communication interfaces and associated communication protocols may be implemented by the second communication interface 136 on the load monitoring and control device 130 for communication with different devices. For example, a wired communication interface may be implemented between the load monitoring and control device 130 and the load 110 and/or the load regulation device 120, while a wireless communication interface may be implemented for communication between load monitoring and control device 130 and the head-end load controller 140. In some embodiments, the load monitoring and control device 130 may communicate with the head-end load controller 140 via a meter (not shown) over the internet or via a local gateway. One of ordinary skill in the art will appreciate that other communications configurations may be used without departing from the scope of the present disclosure.

In accordance with various aspects of the present disclosure, a run time profile for a load indicating a run time may be created. The head-end load controller 140 may create a run time profile for a load that indicates an actual run time for the load for specified periods of time and takes into account various external factors. Each specified load on the electrical power grid may have an individual run time profile. For example, the head-end load controller 140 may create a run time profile for an HVAC system load that accounts for each half hour in a day. The head-end load controller 140 may associate weather conditions (i.e., external factors), such as temperature, humidity, and cloud cover, with each half hour as part of the run time profile for the HVAC system load. The head-end load controller 140 may communicate with the storage device 150 to store the run time profile in the database 155.

The head-end load controller 140 may use the stored run time profile data for a particular load to determine a duty cycle for that load for a load control event. A load control event may be defined as a period of time during which a power utility reduces the load on the power grid by causing certain loads to shut down for at least a portion of the time period. For example, on a very hot day, the load on a power grid from a large number of air conditioning units may overtax the power grid. To avoid damage to the grid, the power utility may institute a load control event to reduce the load on the power grid by causing different loads to operate only at different and/or reduced portions of the time period.

As an example, a run time profile for a particular load may indicate that the run time for a specified half-hour on a certain day with certain weather conditions is 40%, the run_time_percentage, or 12 minutes (i.e., an "off time" of 60% or 18 minutes of the half hour period). The load control system 100 may target a 50% duty cycle (i.e., 15 minutes), the utility_defined_cycle_value, for a load control event, where duty cycle (%) specifies the off time in each load control cycle. In this case, since the load control event overlaps the normal off time of the load (i.e., the 15 minute normal off time of the load occurs during the 18 minutes of the load control event), the shorter 15 minute off time of the load control event would not result in any additional power reduction on the power grid.

In accordance with various aspects of the present disclosure, the load control system 100 (i.e., the head-end load controller 140) may determine the duty cycle for the load using equation 1:

$$\text{Duty cycle (\%)}=1-(\text{run\_time\_percentage}\times\text{utility\_defined\_cycle\_value}) \quad (1)$$

In this example, with a load with a 40% actual run time (i.e., the run_time_percentage) and a 50% utility defined cycle value (i.e., the utility_defined_cycle_value), the head-end load controller 140 may determine duty cycle for the load of: 1−(40%×50%)=80%. If a load control event is initiated using the 80% duty cycle, i.e., 80% off time, then the load is controlled so that it runs 20% of the time, or 6 minutes, during a half hour period.

In accordance with various aspects of the present disclosure, the duty cycle for a load during a load control cycle may be based on actual run time for a particular load. The duty cycle for a different load with a different run time may be different. For example, if the actual run time of a load is 60%, or 18 minutes, during the half hour and the utility defined cycle value is still 50%, then the duty cycle is 70% and the load is controlled so that is runs only 30% of the time, or 9 minutes, during a half hour period.

While the above examples have been calculated using a half hour period of time for a load control event, one of ordinary skill in the art will appreciate that a load control event may be a different time period without departing from the scope of the present disclosure.

In accordance with various aspects of the present disclosure, the head-end load controller 140 may generate a customized load control profile and transmit the load control profile to the load monitoring and control device 130. The load control profile may be based on the run time profile for the load and one or more external factors that affect the run time of the load, as well as present or anticipated loading of the electrical power grid. For example, the load control system may access weather forecast data for the following day and use the forecast data to identify run time data for load operating periods with similar weather conditions. Proximity data, geolocation data, etc., as well as connectivity data of control devices attached to homes that are connected to a certain distribution transformer, substation, phases, etc., may be used to provide additional control of electrical loads. A customized load control profile may be created for each specified load on the electrical power grid.

The load control system 100 may use the run time data for the periods with similar weather conditions to calculate a load control profile for the following day having a similar weather forecast. For example, the head-end load controller 140 may access historical run time data stored in the database 155 in the storage device 150 for the particular load. In some embodiments, the historical run time data may include an average of a specified number of days/weeks may be used. One of ordinary skill in the art will appreciate that other measures of historical run time data may be used without departing from the scope of the present disclosure. Using forecasted weather conditions in combination with historical run time data may allow the load control system 100 to more accurately and efficiently control loads, such as HVAC systems or other loads, since weather conditions may change significantly from one day to the next and impact HVAC run time.

One of ordinary skill in the art will appreciate that while weather forecast data is used as an example, data related to other environmental factors, for example, but not limited to, forecasted power demand, forecasted power generation capability, etc., affecting operation of a particular load may be used without departing from the scope of the present disclosure.

In accordance with various aspects of the present disclosure, the load control system 100 may collect run time data for the loads it controls and use the collected run time data (i.e., run time profiles) at least in part to generate load control profiles for each load. For example, the load monitoring and control device 130 may monitor a load during normal operation of the load and transmit the run time data of the load to the head-end load controller 140. The run time data of the load collected and transmitted by the load monitoring and control device 130 may be only a portion of a time period subsequently specified for a load control event. Based at least in part on the run time data of the load, the head-end load controller 140 may generate run time profile for the load and use the run time profile at least in part to generate a load control profile for the load.

The load control profile may indicate different duty cycles for different periods of time during the day. The differences in duty cycle (i.e., load off time) may be based on differences in the utility defined cycle value, differences in historical run time, or both. The time periods specified in the load control profile may be the same or different than the time periods used to collect run time data. For example, the run time data may reflect a run time percentage for a half hour period and the load control profile may specify a duty cycle for one or more hour periods during the day.

In accordance with various aspects of the present disclosure, the head-end load controller 140 may send the load control profile for the following day to the load monitoring and control device 130 during a daily configuration period. The load monitoring and control device 130 may store the load control profile received from the head-end load controller 140. When the load control system 100 implements a load control event, head-end load controller 140 may transmit a load control command to the load monitoring and control device 130. The load monitoring and control device 130 may accesses the load control profile and execute the specified load control action based on the load control profile.

Figure 4:
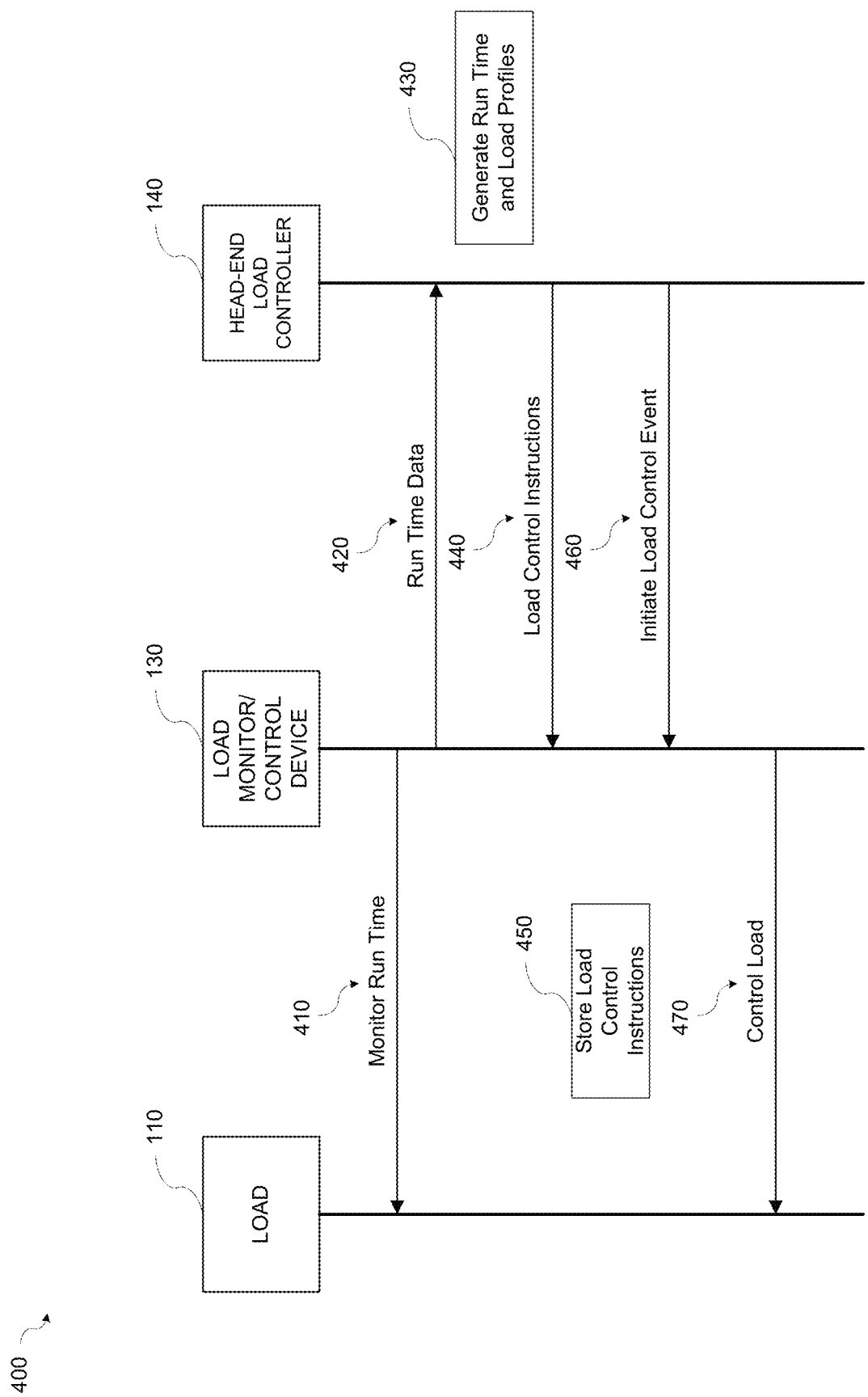
FIG. 4 is a sequence diagram illustrating a load control sequence according to various aspects of the present disclosure.

FIG. 4 is a sequence diagram 400 illustrating a load control sequence according to various aspects of the present disclosure. Referring to FIG. 4, at operation 410, the load monitoring and control device 130 may monitor the normal run time operation of a the load 110. The load monitoring and control device 130 may monitor the run time operation and collect run time data only for a portion of a time period subsequently specified for a load control event. In some embodiments, run time data for operation of a the load may be obtained by the load monitoring and control device 130 from a home energy management system. In some embodiments, run time data may be obtained from electric meter data by using load disaggregation algorithms that take the interval meter data and determine the consumption per appliance.

At operation 420, the load monitoring and control device 130 may transmit via the second communications interface 136 the collected run time data for the load to the head-end load controller 140.

At operation 430, head-end load controller 140 may generate run time and load profiles for the load 110. For example, the head-end load controller 140 may receive the transmitted run time data via the first communications interface 146 and may also obtain data related to external factors (e.g., weather data, etc.) that may affect operation of the load via the first communications interface 146. The head-end load controller 140 may generate run time and load profiles for the load 110 based at least in part on the run time data and external factor data. At operation 440, the head-end load controller 140 may transmit via the first communications interface 146 the load control profile containing load control instructions to the load monitoring and control device 130. At operation 450, the load monitoring and control device 130 may receive the load control profile via the second communications interface 136 and store the load control profile in the second memory 134.

At operation 460, the head-end load controller 140 may transmit an instruction to the load monitoring and control device 130 to initiate a load control event. Alternatively, the load control instructions of operation 440 and the instruction to initiate a load control event may be sent in one operation. At operation 470, the load monitoring and control device 130 may access the stored load control profile and control the load based on the load control instructions contained in the load control profile.

Figure 5:
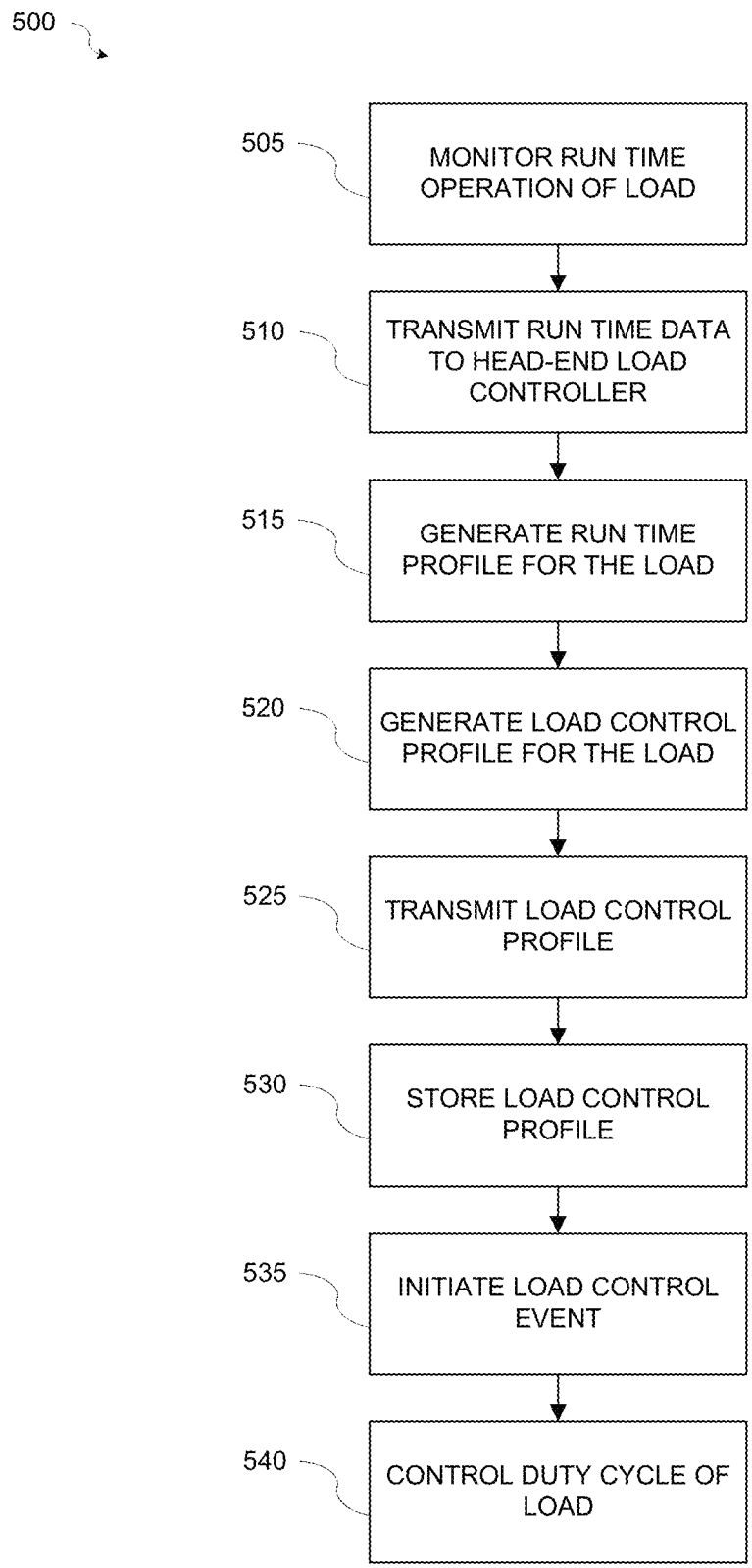
FIG. 5 is a flowchart illustrating a method for adaptive load control according to various aspects of the present disclosure.

FIG. 5 is a flowchart illustrating a method 500 for adaptive load control according to various aspects of the present disclosure. Referring to FIG. 5, at block 505, run time operation of a load may be monitored. The second processor 132 in the load monitoring and control device 130 may cause normal operation of the load 110 to be monitored and may cause run time data of the load 110 to be collected. The load monitoring and control device 130 may monitor and collect the run time data of the load for only of a portion of a time period subsequently specified for a load control event. For example, a subsequent load control event may have 30 minute duration, but the load monitoring and control device 130 may monitor and collect run time data for only 10 minutes in preparation for the load control event.

At block 510, the run time data may be transmitted to the head-end load controller 140. The second processor 132 of the load monitoring and control device 130 may transmit via the second communications interface 136 the collected run time data of the load 110 to the first communications interface of the head-end load controller 140. The first processor 142 of the head-end load controller 140 may cause the run time data of the load to be stored in a database 155 in the storage device 150.

At block 515, a run time profile for the load may be generated. The first processor 142 of the head-end load controller 140 may access the run time data for the load and any historical run time data from the database 155 in the storage device 150, as well as access external data via the first communications interface 146 to generate the run time profile. For example, for an HVAC system load, the first processor 142 of the head-end load controller 140 may access weather data from the Internet via the first communications interface 146 as external data for generating the load profile. One of ordinary skill in the art will appreciate that various other external factors may be relevant to various other loads, and that the other external factors may be accessed for generation a run time profile without departing from the scope of the present disclosure.

At block 520, load control profile for the load 110 may be generated. The load profile may include instructions for operating the load during a load control event. The first processor 142 of the head-end load controller 140 may access the stored run time profile to determine a duty cycle for the load during a load control event. The load control instructions may include a start time and a stop time so that the load monitoring and control device 130 knows when to control the load.

The load control profile may be based at least in part on the present or anticipated loading on the electrical power grid. The load profile may be updated as additional data is collected. For example, for an HVAC system load, the load profile may be updated based on run time data of the load from multiple days with similar weather or other environmental conditions and a new profile created for a sunny, hot summer day or a sunny, cold autumn day. In some embodiments, the updated run time data of the load may be used to create an updated baseline for operation of the load under similar conditions.

At block 525, the load control profile may be transmitted. The first processor 142 of the head-end load controller 140 may cause the first communications interface 146 to transmit the load control profile to the load monitoring and control device 130.

At block 530, the load control profile may be stored. The second processor 132 of the load monitoring and control device 130 may cause the second memory 134 to store the load control profile after the second communications interface 136 receives the load control profile. The load control profile may be received by the load monitoring and control device 130 in advance of a load control event. For example, the load control profile may be received by the load monitoring and control device 130 during a periodic update period one day or another time period prior to a load control event being initiated by the head-end load controller 140.

At block 535, a load control event may be initiated. The head-end load controller 140 may cause the first communications interface 146 to transmit an instruction to the load monitoring and control device 130 to initiate a load control event. The load monitoring and control device 130 may access the load control profile stored in the second memory 134. In some embodiments, the head-end load controller 140 may cause the first communications interface 146 to transmit the load control instructions and the instructions to initiate a load control event during one communication.

At block 540, the duty cycle of the load may be controlled. The load monitoring and control device 130 may cause the second communications interface 136 to transmit commands to the load 110 to control the duty cycle (i.e., the off time) of the load according to the load control instructions contained in the load profile.

Although the foregoing describes that certain operations are performed by the load monitoring and control device 130 and certain operations are performed by a head-end load controller 140, one of ordinary skill in the art will appreciate that other configurations are possible without departing from the scope of the present disclosure. For example, the calculation of the duty cycle may be performed by the load monitoring and control device 130 or the calculation of the load control profile may be performed by a device at an intermediate point in the network.

Although the foregoing examples describe cycling an HVAC unit, other types of loads may also be controlled, including but not limited to water heaters, pool pumps, and electric vehicle charging stations. Factors that may influence or predict usage other than weather may be considered and may differ for different types of loads. In addition, to considering the run_time of a load, the system may also consider historical energy generation by devices, such as solar panels, since their production affects demand.

It should be appreciated that the specific operations illustrated in FIG. 4 provide a particular sequence for performing adaptive load control according to various aspects of the present disclosure. Other sequences of operations may also be performed according to alternative embodiments. For example, load control instructions and instructions to initiate a load control event may be performed as a single communication. One of ordinary skill in the art would recognize many variations, modifications, and alternatives.

The method 500 may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. An adaptive load control system, comprising:
   a load monitoring and control device including a processor, the load monitoring and control device configured to monitor operating conditions of a load connected to an electrical power grid, and transmit load operating condition data across a network; and
   a head-end load controller located remotely from the load monitoring and control device and configured to:
      receive the load operating condition data across the network;
      obtain data from external sources about external factors that influence load operating conditions;
      generate one or more load control profiles based at least in part on the data from external sources that control a duty cycle for the load during a scheduled load control event; and
      transmit the one or more load control profiles to the load monitoring and control device across the network,
      wherein the one or more load control profiles include instructions to increase off time of the duty cycle for the load when the scheduled load control event overlaps a normal off time of the load, and
      wherein one of the one or more load control profiles is selected by the load monitoring and control device according to an instruction received from the head-end load controller, the instruction based at least in part on a comparison of the data from external sources used to create the selected load control profile and a forecast of external conditions during the scheduled load control event.

2. The system of claim 1, wherein the head-end load controller is configured to increase the off time of the duty cycle based on the normal off time of the load and a specified cycle value,
   wherein the cycle value is a specified value by which the normal off time is increased.

3. The system of claim 1, wherein the head-end load controller is configured to generate an individual run time profile for each specified load.

4. The system of claim 1, wherein the head-end load controller is configured to generate the load control profile for the load based at least in part on a run time profile.

5. The system of claim 1, wherein the head-end load controller is configured to generate the load control profile based at least in part based on a run time profile, the data about external factors, and anticipated loading on the electrical power grid.

6. The system of claim 1, wherein the load monitoring and control device monitors operating conditions of the load for a specified period of time during normal operation of the load.

7. The system of claim 6, wherein the specified period of time for monitoring the load is shorter than a duration of a load control event.

8. The system of claim 1, wherein the load control profiles transmitted by the head-end controller are stored in a memory of the load monitoring and control device.

9. A method for adaptively controlling a load, the method comprising:
   monitoring, by a load monitoring and control device, operating conditions of a load connected to an electrical power grid to obtain operating condition data for the load;
   receiving, by a head-end load controller, the operating condition data across a network and obtaining, by the head-end load controller, data from external sources about external factors that influence the load operating conditions;
   generating, by the head-end load controller, one or more load control profiles based at least in part on the received operating condition data and the data from external sources, the one or more load control profiles configured to control a duty cycle for the load during a scheduled load control event;
   transmitting, by the head-end load controller, the one or more load control profiles to the load monitoring and control device across the network; and
   selecting, by the load monitoring and control device, one of the one or more load control profiles according to an instruction received from the head-end load controller, the instruction based at least in part on a comparison of the data from external sources used to create the selected load control profile and a forecast of external conditions during the scheduled load control event,
   wherein the one or more load control profiles includes instructions to increase off time of the duty cycle for the load when the scheduled load control event overlaps a normal off time of the load.

10. The method of claim 9, further comprising increasing the off time of the duty cycle based on the normal off time of the load and a specified cycle value,
   wherein the cycle value is a specified value by which the normal off time is increased.

11. The method of claim 9, further comprising generating an individual run time profile for each specified load.

12. The method of claim 9, further comprising generating the load control profile for the load based at least in part on a run time profile.

13. The method of claim 9, further comprising generating the load control profile based at least in part based on a run time profile, the data about external factors, and anticipated loading on the electrical power grid.

14. The method of claim 9, further comprising monitoring the operating conditions of the load for a specified period of time during normal operation of the load.

15. The method of claim 14, wherein the specified period of time for monitoring the load is shorter than a duration of a load control event.

16. The method of claim 9, further comprising storing, in a memory of the load monitoring and control device, the load control profiles transmitted by the head-end controller.

\* \* \* \* \*